UNITED STATES PATENT OFFICE.

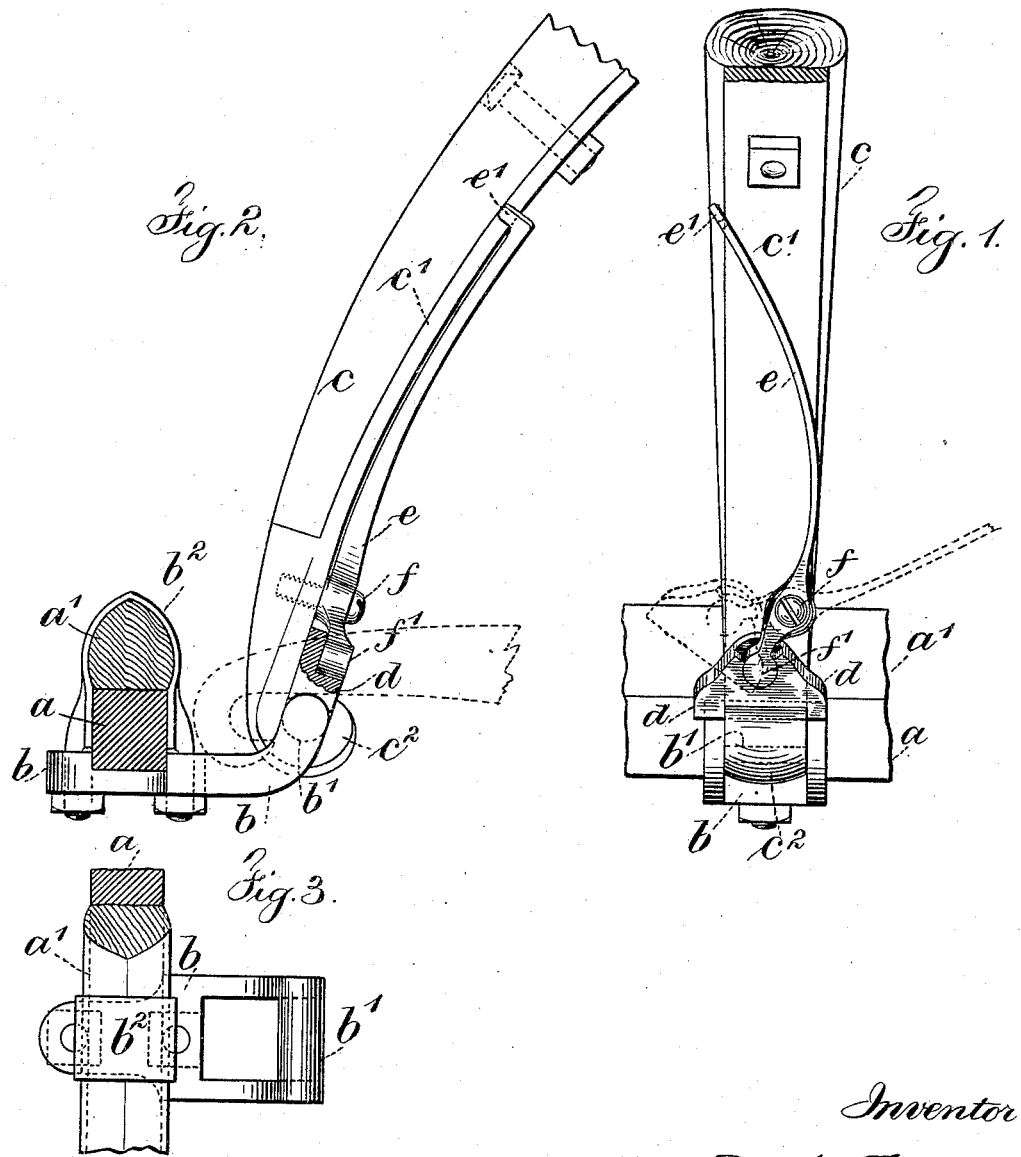

VERNON A. TYLER, OF MORRIS PARK, NEW YORK.

THILL-COUPLING.

SPECIFICATION forming part of Letters Patent No. 474,070, dated May 3, 1892.

Application filed January 8, 1892. Serial No. 417,364. (No model.)

*To all whom it may concern:*

Be it known that I, VERNON A. TYLER, a citizen of the United States, residing at Morris Park, in the county of Queens and State of New York, have invented a new and useful Improvement in Thill-Couplings, of which the following is a specification.

My invention relates to a coupling for connecting the shafts or pole of a carriage or wagon to the fore axle; and the objects of my said invention are to be able to readily and quickly detach the parts, to prevent rattle, and to take up wear, all of which are accomplished by one simple device.

In carrying out my invention I employ a clip upon the fore axle having a pintle, a thill-iron connected to the shaft or pole and having a hook at the end to engage the pintle, and I provide a spring-lever pivoted to the thill-iron and a sliding block, in which the short arm of the lever bears, this block bearing upon the surface of the pintle and being acted upon by the spring-lever to hold the parts in place and to press against the pintle to keep the parts tight and prevent rattle and to operate automatically in taking up wear.

My improved device allows the shafts or pole to be quickly detached from the carriage or wagon, it being only necessary to release the spring-lever and swing the sliding block away from the face of the pintle when the shafts or pole are down in order to remove the thill-iron hook from the fore-axle clip.

In the drawings, Figure 1 is a front elevation showing my improvement. Fig. 2 is a side elevation and partial section of the same, and Fig. 3 is a plan view of part of the fore axle and the clip.

The fore axle may be composed, as usual, of the metal portion $a$ and wood portion $a'$ of any desired form or dimensions. The clip is composed of the plate portion $b$, the round pintle $b'$, and strap $b^2$, the plate $b$ having projecting arms united by the integrally-formed pintle $b'$, within which is an opening to receive the hook end of the thill-iron. $c$ represents the shaft or pole of the carriage or wagon, and $c'$ the thill-iron secured at the end of the same, and on the end of the thill-iron is a hook $c^2$. The end of the thill-iron and its hook $c^2$ are adapted to pass into the opening in the plate $b$ and engage the pintle $b'$ when the shaft or pole is at its lowest position, and the same preferably cannot be removed when the shaft or pole is elevated, because in this position the horizontal width of the hook $c^2$ and base of the thill-iron is greater than that of the opening in the plate $b$.

$d$ is a block concave upon its under side and adapted to fit and slide upon the outer face of the pintle $b'$ and to fit in the mouth of the hook $c^2$, and said block is longer than the length of the pintle $b'$. A spring-lever $e$ is pivoted by a screw $f$ to the under side of the thill-iron, and the end of its short arm is made with a circular disk $f'$, engaging a recess in the block $d$, and the long arm of said lever forms the spring and is terminated with a right-angled offset or catch $e'$, which springs over the vertical edge of the thill-iron. In this position (best seen in Fig. 1) the tendency of the spring-lever is to move the sliding block $d$ toward the right and cause the block and hook $c^2$ to tightly hug the pintle, and thus prevent any rattle of the parts, and any looseness from wear of the parts is also immediately and automatically taken up by the sliding block $d$ as acted upon by the spring-lever.

To remove the shaft or pole from the clip, the offset or catch $e'$ is disengaged and the lever and block swing over into the dotted position of Fig. 1, in which the block $d$ is disengaged, so that the parts can be separated. The block $d$ covers the pintle $b'$ and fills the opening in the hook $c^2$ effectually, so that there is no opportunity for dust to pass in between the parts.

I prefer to make my improved thill-couplings in pairs to operate right and left for the respective ends of the shafts or poles, as it is more convenient to operate them in this manner for disengaging the shafts or pole from a vehicle.

I claim as my invention—

1. The combination, with the clip having an opening in its plate and the integrally-formed pintle, of the thill-iron for a shaft or pole and its hook adapted to engage said pintle, a sliding block concave on the under side to fit said pintle, a spring-lever pivoted to the under side of the thill-iron and engaging by its short arm the sliding block and by the end of its long arm the thill-iron, substantially as and for the purposes set forth.

2. The combination, with the clip and the integrally-formed round pintle, of the thill-iron for a shaft or pole and its hook adapted to engage said pintle, a sliding block concave on its under side and fitting over and in length extending beyond said pintle and filling the open mouth of the hook, and a spring-lever pivoted to the under side of the thill-iron and having a circular end on its short arm engaging a recess in the sliding block and the long end of said spring-lever having a catch for locking the lever, whereby the sliding block automatically keeps the parts tight and takes up wear, substantially as set forth.

Signed by me this 2d day of January, A. D. 1892.

VERNON A. TYLER.

Witnesses:
GEO. T. PINCKNEY,
HAROLD SERRELL.